June 25, 1963

V. C. SMITH 3,095,259

HOLLOW ENCLOSED MOLDED ARTICLES WITH MOLDED
INTERNAL WALL SURFACES

Filed Jan. 9, 1961

INVENTOR.
VERITY C. SMITH

BY KENWAY, JENNEY, WITTER & HILDRETH

ATTORNEYS

United States Patent Office 3,095,259
Patented June 25, 1963

3,095,259
HOLLOW ENCLOSED MOLDED ARTICLES WITH MOLDED INTERNAL WALL SURFACES
Verity C. Smith, Dedham, Mass., assignor to Barnstead Still and Sterilizer Co., Boston, Mass., a corporation of Massachusetts
Filed Jan. 9, 1961, Ser. No. 81,641
6 Claims. (Cl. 18—58)

This invention releates to enclosed hollow molded plastic articles and provides a novel method of forming such articles with an internal molded wall surface. The present application is a continuation-in-part of my application, Serial No. 816,753, filed May 29, 1959, now abandoned.

A useful method of forming hollow plastic articles is by the slush molding of heat-hardenable, liquid, resin compositions such as plastisols. A plastisol is a dispersion of resin particles in a plasticizer which, upon heating, will form a solid gel through the combining of the plasticizer and the resin. In slush molding, the mold is filled with the plastisol and heated to cause gelation at the mold surface. After a layer of the desired thickness has formed, the plastisol still in the liquid state is drained from the mold, and the gelled resin composition is then finally cured by further heating.

Enclosed hollow slush molded articles heretofore produced have been limited to types having only an outer wall surface formed by a mold. The internal wall surface has been that resulting at the inward limit of gelation during the initial heating.

The present invention provides a method of forming an enclosed hollow slush molded product having an internal molded wall surface entirely within the molded article. The term "enclosed" is intended to include substantially enclosed hollow articles, having one or more ports in the walls thereof. By way of example, this invention may be used to produce enclosed containers for materials used to treat water or other liquids, and the internal molded wall surface may provide a bottom drainage area. The container may also include a port or opening to which the molded passages direct the liquid, as well as other internal configurations. Often a tapped side drain is required in such a container, and such may be formed in the same molding operation as the internal molded surface. Internal molded wall surfaces can be formed economically without resorting to expensive machining operations subsequent to molding.

In general, the process for making the articles follows closely to ordinary slush molding processes such as described in "Plastisol Molding," Modern Plastics Encyclopedia, 1959, pages 804–808, with additional steps for producing the molded interior wall surface region. Liquid heat hardenable resinous material such as a plastisol is poured into hollow complementary molds adapted to form separate members of the completed hollow article. The molds may be either preheated or heated after the addition of the liquid. After a sufficient amount of liquid has hardened at the inner surface of each mold to provide the desired wall thickness of the molded article, those molds which are to form members having internal molded surfaces are dumped to allow a portion of the liquid to drain out, and the molds are then reinverted so that the remainder collects as a puddle within the molded form. An internal mold is placed in the puddle to impart the desired internal wall surface contour, and the entire mold is heated until all the resin still remaining liquid is hardened. If any of the members are not to have molded internal surfaces, the corresponding molds are completely drained of liquid when a sufficiently thick wall of hardened material has formed. Heating is continued until any remaining liquid has hardened.

The complementary molds are arranged to form mating flange portions in the separate members of the article, for subsequent attachment to form the completed hollow article.

Where a port or opening is desired, it is only necessary to provide the external mold with an inwardly projecting stud which may fit snugly into an opening in the internal mold and thereby accurately position it. In that manner, when the liquid has hardened around the stud and internal mold, an opening is provided, which can join smoothly with the internal molded wall surface. Other openings may be provided by placing removable threaded plugs in the walls of the external mold.

Figure 1:
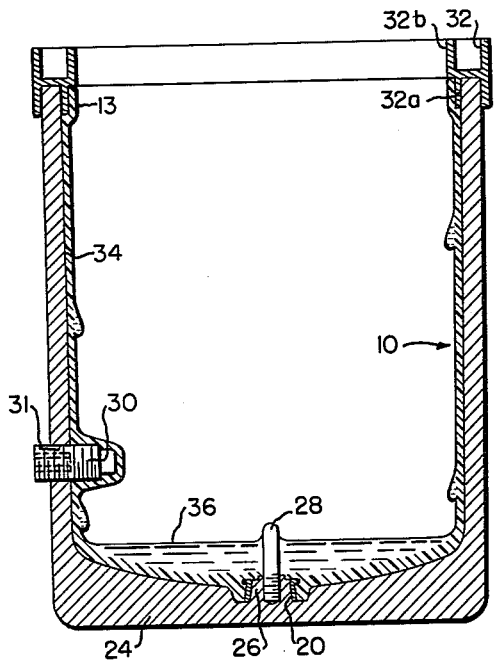
FIG. 1 is a view in cross-section showing the molding of the bottom half of a container for treating liquids with an ion exchange resin, wherein the liquid resin is forming a puddle at the bottom of the mold.
Figure 2:
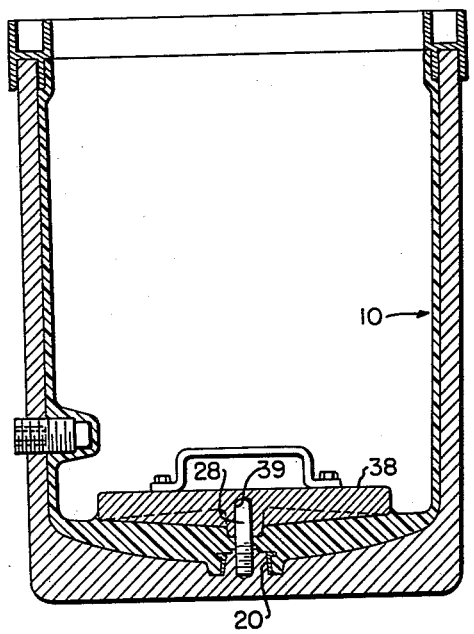
FIG. 2 shows the internal mold plate in place in the puddle as described with reference to FIG. 1.
Figure 3:
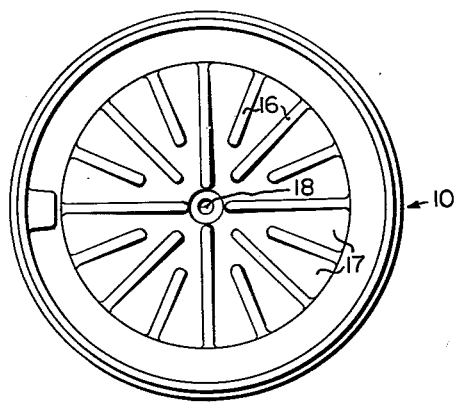
FIG. 3 is a plan view of the bottom of the molded article described with reference to FIGS. 1 and 2.
Figure 4:
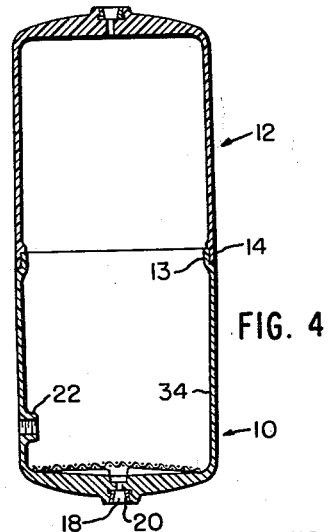
FIG. 4 is a cross-sectional view of the assmbled container, the bottom of which is referred to with reference to FIGS. 1, 2 and 3.

The invention is shown in the accompanying drawings as it may be applied to the manufacture of a container for treating water or other liquids with an ion exchange material. The container consists in general of two plastisol slush molded halves 10 and 12 (FIG. 4) which are formed separately and joined together by mating flange portions 13 and 14 formed respectively at their edges. The upper half member 12 is conveniently formed by conventional slush molding techniques and need not embody any internal molded wall surface as provided by this invention. However, it will be apparent that each member may be formed with molded internal wall surfaces if desired. The invention is utilized in particular in the formation of the bottom half member 10 to provide an internal wall surface with a drainage region consisting in general of radial ribs 16 having inwardly sloping channel portions 17 between them. A drainage port 18 formed with an internal metal collar 20 is situated at the bottom of the bottom half member 10 and connects with the drainage area. A side port 22, useful for the introduction of rinse water and regenerate solution, is also provided.

The molding of the half member 10 utilizes an outer mold casing 24 having an internal configuration corresponding with the desired external shape of the bottom half member 10. The bottom of the mold casing is formed with an inwardly projecting stud 26 which terminates in a centering pin 28, and a threaded stud 30 retained within a correspondingly tapped opening 31 extends inwardly from the side of the casing 24 to provide for the formation of the side opening 22.

The sleeve 20, which will form an integral part of the bottom half member 10 and serve as a rigid member to which a fluid coupling connection may be made, is first inserted over the stud 26, and a rim molding ring 32 is fitted over the edge of the mold casing 24 to form the edge flange 13. The mold is then filled with a heat-hardenable resin composition, typically a vinyl plastisol, which is then caused to solidify in the region of the internal walls of the mold casing 24. For this purpose the casing 24 may have been preheated, or alternatively heating may be carried out after the resinous composition has been placed in the casing. Solidification of the resin results in the formation of the walls 34 of the bottom half member 10, and their thickness is controlled by the degree to which solidification is continued. It will be noted also that the resinous composition solidifies over and around the stud 30 to form an inwardly extending depression having threaded walls corresponding to the threads on the stud 30.

After a wall of sufficient thickness has been formed, the casing 24 is inverted and the bulk of the still liquid resinous material is removed. The casing 24 is then re-inverted and the remaining liquid material, an amount sufficient to form the bottom drainage area, is permitted to collect in the bottom of the mold to form a puddle 36. The rib 16 and channel 17 are formed in the puddle 36 by means of an internal mold plate 38 having a bottom configuration corresponding in a complementary way with the rib 16 and channel 17. The mold plate 38 is conveniently formed with a central opening 39 by which it may be fitted onto, and accurately positioned by, the centering pin 28, which also serves to provide a drainage opening through the bottom part of the bottom half member 10. After the mold plate is in place, the entire assembly is placed in an oven to bring the resinous composition to its final state of cure. Where molding is carried out in the preferred manner, using a polyvinyl chloride plastisol, the final cure is accomplished by placing the assembly in an oven at 375° F. for 1 hour.

After curing of the molded article, the assembly is permitted to cool and the mold plate 38 and rim molding ring 32 are removed, the stud 30 is unscrewed from the tapped opening 31 and the inner part of the depression frequently formed about the stud is cut away to provide an opening in the wall. The half member 10 is then removed from the mold, for final assembly with the top half member 12, which will have been formed in similar fashion, but not necessarily with an internal molded wall portion.

Molding of the top half member 12 may be carried out in the same mold casing 24, with the threaded stud 30 inserted such that its inner end is flush with the inside of the casing. The rim molding ring 32 is formed with two flange-forming portions, an outer ring portion 32a, used as shown to form an inner flange, and an inner portion 32b which may be used simply by inverting the ring, to form an outer flange portion such as 14. The flanges 13 and 14 are subsequently joined by a suitable cement, or in any desired manner.

From the foregoing description it will be seen that this invention provides a simple and convenient means of imparting internal wall configuration to enclosed hollow slush molded articles, and thereby greatly expands the utility of this simple molding process.

Although the invention has been described in detail with specific reference to its preferred embodiment, it is believed apparent that numerous modifications will occur to those skilled in the art and familiar with this disclosure, and that such may be made without departing from the scope of this invention.

Having thus disclosed my invention and described in detail a preferred embodiment thereof, I claim and desire to secure by Letters Patent:

1. A method of making substantially enclosed hollow slush molded articles having an internal molded wall surface, comprising filling complementary molds with a heat-hardenable liquid resinous material, heating said resinous material at the surface of said molds to cause a portion of said resinous material in contact with the internal surfaces of said molds to harden, partially draining at least one of said molds and leaving a reservoir of liquid resinous material therein, placing an internal mold in said reservoir, draining any remaining ones of said molds, heating said liquid resinous material in said molds to cause it to harden, removing the heat-hardened resinous members so formed from the molds, and joining the members to complete the article.

2. A method according to claim 1 wherein the molds are heated prior to filling them with said liquid resinous material.

3. A method according to claim 1 wherein the liquid resinous material is a vinyl plastisol.

4. A method of making substantially enclosed hollow slush molded articles having an internal molded wall surface, comprising filling complementary molds selected to form members having mating flange portions with a heat-hardenable liquid resinous material, heating said resinous material at the surfaces of said molds to cause a portion of said resinous material in contact with the internal surfaces of said molds to harden, partially draining at least one of said molds and leaving a reservoir of liquid resinous material at the bottom, placing an internal mold in said reservoir, draining any remaining ones of said molds, heating said liquid resinous material in said molds to cause it to harden, removing the heat-hardened resinous members so formed from the molds, and joining the mating flanges of the members to complete the article.

5. A method of making substantially enclosed hollow slush molded articles having an internal molded wall surface and an outlet opening joining therewith, comprising filling complementary molds, at least one of which has an inwardly projecting stud corresponding to the outlet opening of the molded article, with a heat-hardenable liquid resinous material, heating said resinous material at the surface of said molds to cause the portion of said resinous material in contact with the internal surface of said molds to harden, partially draining said one of said molds and leaving a reservoir of liquid resinous material at the bottom, placing an internal mold in said reservoir and in contact with said stud, thereby forming an opening joining with the internal wall surface formed by said internal mold, heating said liquid resinous material in said one of said molds to cause it to harden, draining the remaining ones of said molds, removing the heat-hardened resinous members so formed from the molds, and joining the members to complete the article.

6. A method of making substantially enclosed hollow slush molded articles having an internal molded wall surface and an outlet opening lined by a metal sleeve joining therewith, comprising filling complementary molds at least one of which has an inwardly projecting stud containing a removable metal sleeve corresponding to said outlet opening with a heat-hardenable liquid resinous material, heating said resinous material at the surface of said molds to cause a portion of said resinous material in contact with the internal surfaces of said molds to harden, partially draining said one of said molds and leaving a reservoir of liquid resinous material at the bottom, placing an internal mold in said reservoir and in contact with said stud, thereby forming an opening having a wall portion lined with a metal sleeve and joining with the surface formed by said internal mold, draining any remaining ones of said molds, heating said liquid resinous material to cause it to harden, removing the heat-hardened resinous members so formed, including said metal sleeve, from said molds, and joining the members to complete the article.

References Cited in the file of this patent

UNITED STATES PATENTS

| | | |
|---|---|---|
| 2,324,974 | Grennup | July 20, 1943 |
| 2,808,967 | Miller | Oct. 8, 1957 |
| 2,908,943 | Miller | Oct. 20, 1959 |
| 2,915,788 | Engel | Dec. 8, 1959 |
| 2,939,180 | Hickler et al. | June 7, 1960 |
| 2,974,373 | Streed et al. | Mar. 14, 1961 |
| 3,035,309 | Bingham | May 22, 1962 |